(12) United States Patent
Arad

(10) Patent No.: US 8,873,555 B1
(45) Date of Patent: Oct. 28, 2014

(54) PRIVILEGE-BASED ACCESS ADMISSION TABLE

(75) Inventor: Nir Arad, Nesher (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 2076 days.

(21) Appl. No.: 11/347,444

(22) Filed: Feb. 2, 2006

(51) Int. Cl.
*H04L 12/28* (2006.01)

(52) U.S. Cl.
USPC .................. 370/392; 370/401; 455/433

(58) Field of Classification Search
USPC ............. 370/401, 352, 289, 353, 216, 225; 705/26, 40; 726/22, 29, 23, 11, 6
See application file for complete search history.

(56) References Cited

U.S. PATENT DOCUMENTS

| | | | | |
|---|---|---|---|---|
| 6,101,188 A * | 8/2000 | Sekine et al. | | 370/401 |
| 6,182,227 B1 * | 1/2001 | Blair et al. | | 726/5 |
| 7,068,598 B1 * | 6/2006 | Bryson et al. | | 370/230 |
| 7,360,090 B1 * | 4/2008 | Doskow et al. | | 713/170 |
| 7,496,351 B2 * | 2/2009 | Roach, Jr. | | 455/411 |
| 7,559,081 B2 * | 7/2009 | Seidlein | | 726/9 |
| 7,920,564 B1 * | 4/2011 | Arad | | 370/392 |
| 7,965,842 B2 * | 6/2011 | Whelan et al. | | 380/247 |
| 8,160,080 B1 * | 4/2012 | Arad et al. | | 370/401 |
| 8,286,237 B2 * | 10/2012 | Moghe | | 726/22 |
| 8,571,222 B1 * | 10/2013 | Perry et al. | | 380/270 |
| 2002/0058507 A1 * | 5/2002 | Valentine et al. | | 455/433 |
| 2004/0218596 A1 * | 11/2004 | Tagore-Brage et al. | | 370/389 |
| 2005/0226235 A1 * | 10/2005 | Kumar et al. | | 370/386 |
| 2006/0259583 A1 * | 11/2006 | Matsuura | | 709/218 |
| 2008/0049621 A1 * | 2/2008 | McGuire et al. | | 370/236.2 |
| 2008/0172366 A1 * | 7/2008 | Hannel et al. | | 707/3 |
| 2011/0078775 A1 * | 3/2011 | Yan | | 726/6 |
| 2011/0173682 A1 * | 7/2011 | Perry et al. | | 726/4 |
| 2012/0030737 A1 * | 2/2012 | Pagan et al. | | 726/5 |

* cited by examiner

*Primary Examiner* — Michael J Moore, Jr.

(57) ABSTRACT

Data packets are received at a network interface. A source address and a destination address are extracted from each data packet. Thereafter, a first query is performed in an address database to retrieve access group information associated with the source address. A second query is performed in the address database to retrieve resource group information associated with the destination address. Based upon the access group and the resource group, a command is assigned to the data packet. Optionally, the access group information and resource group information are used in connection with an access matrix to assign the command to the data packet.

32 Claims, 7 Drawing Sheets

PRIVILEGE-BASED ACCESS ADMISSION TABLE

BACKGROUND OF THE INVENTION

This disclosure relates generally to packet processing on data networks and, more specifically to controlling access to network devices.

Packet-based networks have grown in number and size over the years. In these networks, a sender communicates with a recipient by placing data packets on the network. Each data packet generally contains a source address and a destination address. These addresses may be used by a network packet processor to direct the packet to its final destination on the network.

Network packet processors may also play a role in maintaining network security. Network security can involve processing data packets to verify whether they should be allowed to reach their destination. For example, a network packet processor may determine whether a particular host should be allowed to access a particular server.

Conventional packet processors may not perform all of these functions or may perform these functions in a limited manner. Additionally, conventional packet processors may not be able to respond dynamically to changing conditions on the network. Thus, there is a need in the art for a network packet processor that can respond dynamically to conditions and that can direct data packets to their final destination while maintaining network security.

SUMMARY OF THE INVENTION

In accordance with one embodiment of the present invention, a method for processing data packets on a network is disclosed. The data packets are received at a network interface. A source address and a destination address are extracted from each data packet. Thereafter, a first query is performed on an address database to retrieve access group information associated with the source address. A second query is performed on the address database to retrieve resource group information associated with the destination address. Based upon the access group and the resource group, a command is assigned to the data packet. In a specific embodiment, the data packets are IP data packets.

According to another embodiment of the present invention, a method for processing data packets on a network is disclosed. The method includes determining a command to assign to a data packet based upon an access matrix. The access matrix may specify exemplary commands including FORWARD, HARD DROP, and SOFT DROP for the data packet based upon the access group and the resource group of the data packet. In one embodiment, information about data packets assigned the SOFT DROP command is entered in a log.

According to another embodiment of the present invention, the access group information associated with a source address and/or the resource group associated with a destination address are changed in response to authentication data packets received at the network interface. The authentication data packets may originate from an authentication server connected to the network. In a specific embodiment, the authentication server requires a password, smart card, or biometric identification before sending authentication packets.

In accordance with another embodiment of the present invention, data packets are processed using Layer 2 source and destination addresses. In a specific embodiment, the address database includes a forwarding address database. Still further embodiments of the present invention may assign default access group information to a data packet when the source address is not found in a forwarding address database and may assign default resource group information to a data packet when the destination address is not found in the forwarding address database.

According to another embodiment of the present invention, data packets are processed using Layer 3 source and destination addresses. In a specific embodiment, the data packets are IP data packets and the address database includes an IP next-hop table. Still further embodiments may implement a longest-prefix match algorithm to find addresses and return access group information and resource group information from a next-hop table. Default access group information and default resource group information may be returned from the next-hop table for zero-length prefix matches. In a specific embodiment, an entry corresponding to the network broadcast address is included in the address database.

In accordance with another embodiment of the present invention, a network device for processing data packet traffic is disclosed. The network device includes a network interface configured to receive data packets from a network, a parsing engine configured to extract a source address and a destination address from a received data packet, an address database, a query engine configured to retrieve access group information associated with the source address and resource group information associated with the destination address from the address database, and a processing engine configured to assign a command to the data packet based upon the access group information and the resource group information retrieved from the address database. In a specific embodiment, the data packets are IP data packets.

According to an embodiment of the network device, the processing engine assigns commands to data packets as specified in an access matrix. In some embodiments, the access matrix may specify exemplary commands including FORWARD, HARD DROP, and SOFT DROP for the data packet based upon the access group and the resource group of the data packet. In one embodiment, the processing engine logs information about data packets assigned the SOFT DROP command.

According to another embodiment of the network device, the query engine modifies an entry in the address database in response to authentication data packets received at the network interface. The authentication data packets may originate from an authentication server connected to the network. In a specific embodiment, the authentication server requires a password, smart card, or biometric identification before sending authentication packets.

In accordance with another embodiment of the network device, the query engine retrieves information from the address database using Layer 2 source and destination addresses. In a specific embodiment, the address database includes a forwarding address database. Still further embodiments of the present invention may assign default access group information to a data packet when the source address is not found in a forwarding address database and may assign default resource group information to the data packet when a destination address is not found in the forwarding address database.

According to another embodiment of the network device, the query engine retrieves information from the address database using Layer 3 source and destination addresses. In a specific embodiment, the data packets are IP data packets and the address database includes an IP next-hop table. Still further embodiments may implement a longest-prefix match algorithm to find addresses and return access group information and resource group information from a next-hop table. Default access group information and default resource group information may be returned from the next-hop table for zero-length prefix matches. In a specific embodiment, an entry corresponding to the network broadcast address is included in the address database.

In accordance with another embodiment of the present invention, an apparatus adapted for processing data packets on a network includes, in part, means for receiving a data packet at a network interface, means for extracting a source address and a destination address from each data packet, means for performing a first query on an address database to retrieve access group information associated with the source address and means for performing a second query on the address database to retrieve resource group information associated with the destination address. Additionally, means for assigning a command to the data packet based upon the access group and the resource group are provided. Data packets for such embodiment may include IP data packets.

According to another embodiment of the present invention, an apparatus for processing data packets on a network includes, in part, means for determining a command to assign to a data packet based upon an access matrix. The access matrix may specify exemplary commands including FORWARD, HARD DROP, and SOFT DROP for the data packet based upon the access group and the resource group of the data packet. In one embodiment, means for logging information about data packets assigned the SOFT DROP command are also included.

According to another embodiment of the present invention, means for changing the access group information associated with a source address and/or the resource group associated with a destination address are provided. These changes may be directed by authentication data packets received at the network interface. The authentication data packets may originate from an authentication server connected to the network. In a specific embodiment, the authentication server requires a password, smart card, or biometric identification before sending authentication packets.

In accordance with another embodiment of the present invention, means for processing data packets using Layer 2 source and destination addresses are included. In a specific embodiment, the address database includes a forwarding address database. Still further embodiments of the present invention may include means for assigning default access group information to a data packet when the source address is not found in a forwarding address database and means for assigning default resource group information to a data packet when the destination address is not found in the forwarding address database.

According to another embodiment of the present invention, means for processing data packets using Layer 3 source and destination addresses are included. In a specific embodiment, the data packets are IP data packets and the address database includes an IP next-hop table. Still further embodiments may include means for implementing a longest-prefix match algorithm to find addresses and means for returning access group information and resource group information from a next-hop table. Means for returning default access group information and means for returning default resource group information from the next-hop table for zero-length prefix matches may also be included. In a specific embodiment, an entry corresponding to the network broadcast address is included in the address database.

In accordance with another embodiment of the present invention, an apparatus adapted for processing data packets on a network includes, in part, code for receiving a data packet at a network interface, code for extracting a source address and a destination address from each data packet, code for performing a first query on an address database to retrieve access group information associated with the source address and code for performing a second query on the address database to retrieve resource group information associated with the destination address. Additionally, code for assigning a command to the data packet based upon the access group and the resource group is provided. Data packets for such embodiment may include IP data packets.

According to another embodiment of the present invention, an apparatus for processing data packets on a network includes, in part, code for determining a command to assign to a data packet based upon an access matrix. The access matrix may specify exemplary commands including FORWARD, HARD DROP, and SOFT DROP for the data packet based upon the access group and the resource group of the data packet. In one embodiment, code for logging information about data packets assigned the SOFT DROP command is also included.

According to another embodiment of the present invention, code for changing the access group information associated with a source address and/or the resource group associated with a destination address is provided. These changes may be directed by authentication data packets received at the network interface. The authentication data packets may originate from an authentication server connected to the network. In a specific embodiment, the authentication server requires a password, smart card, or biometric identification before sending authentication packets.

In accordance with another embodiment of the present invention, code for processing data packets using Layer 2 source and destination addresses is included. In a specific embodiment, the address database includes a forwarding address database. Still further embodiments of the present invention may include code for assigning default access group information to a data packet when the source address is not found in a forwarding address database and code for assigning default resource group information to a data packet when the destination address is not found in the forwarding address database.

According to another embodiment of the present invention, code for processing data packets using Layer 3 source and destination addresses is included. In a specific embodiment, the data packets are IP data packets and the address database includes an IP next-hop table. Still further embodiments may include code for implementing a longest-prefix match algorithm to find addresses and code for returning access group information and resource group information from the next-hop table. Code for returning default access group information and code for returning default resource group information for zero-length prefix matches may also be included. In a specific embodiment, an entry corresponding to the network broadcast address is included in the address database.

Further areas of applicability of the present invention will become apparent from the detailed description provided hereinafter. It should be understood that the detailed description and specific examples, while indicating various embodiments of the invention, are intended for purposes of illustration only and are not intended to necessarily limit the scope of the invention.

DETAILED DESCRIPTION OF THE INVENTION

A method for processing data packets on a network and a network packet processor are disclosed. Data packets are received at a network interface. A source address and a destination address are extracted from each data packet. Thereafter, a first query is performed on an address database to retrieve access group information associated with the source address. A second query is performed on the address database to retrieve resource group information associated with the destination address. Based upon the access group and the resource group, a command is assigned to the data packet.

Figure 1:
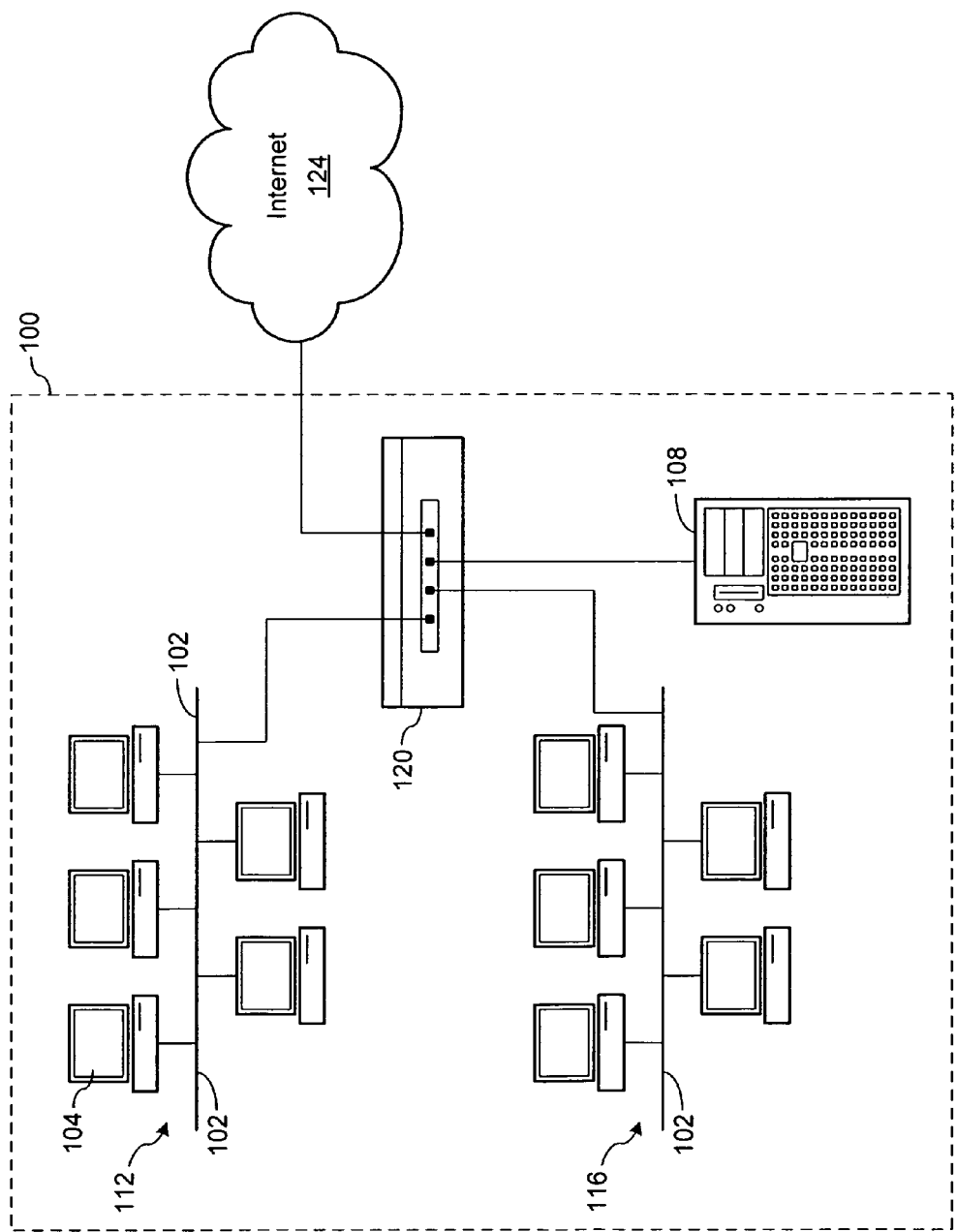
FIG. 1 shows a multitude of devices in communication with a network packet processor according to an embodiment of the present invention.

Initially referring to FIG. 1, a high-level view of a network packet processor ("packet processor") and its relationship to other network components is shown. The network 100 includes components that are interconnected by a physical medium 102. For example, the network 100 might be an Ethernet network and the physical medium might be Category-5 twisted pair cable or single-mode fiber optic cable. The physical medium 102 provides a path for the exchange of data between the network components.

Two local area network (LAN) segments 112, 116 are depicted. Each segment includes individual workstations 104 connected to the physical medium 102. In the Ethernet example, packets directed to a particular LAN segment 112, 116 are received by all workstations 104 on that segment. In addition, all workstations 104 on a particular LAN segment 112, 116 contend for access to the physical medium 102 when they wish to transmit packets over the network 100.

A server 108 is also shown connected to a separate segment of the network 100. The server 108 may provide resources such as software applications, file sharing, and printers to the workstations 104 in the network 100. In this arrangement, individual workstations 104 in a particular network segment 112, 116 all share bandwidth on their respective physical media 102 whereas the server 108 does not share bandwidth with other devices. For example, the server 108 may have exclusive access to a 1 Gbits/s connection whereas the individual workstations 104 on the LAN segments 112,116 may share 100 Mbits/s connections.

The LAN segments 112, 116 and the server 108 are connected to a network packet processor 120 in accordance with an embodiment of the present invention. The network packet processor 120 performs several functions. For example, the packet processor 120 may switch data packet traffic between the separate LAN segments 112, 116 and/or the server 108 to increase network efficiency. Similarly, the packet processor may route packets to a destination on another network. The packet processor 120 may also prevent malformed data packets from propagating through the network and may regenerate and retransmit data packets to ensure their integrity.

The packet processor 120 maintains an address database with entries for each device connected to a local area network segment 112, 116 and for the server 108. The address database may be a forwarding address database. The packet processor 120 stores two sets of information about each network address in the address database. The first set of information is used when the network address is a source address. The second set of information is used when the network address is a destination address.

The network packet processor 120 may also be connected to the Internet 124. Data packets directed from the network 100 to the Internet 124 are typically routed to their final destination through a series of intermediate network devices ("hops"). The network packet processor 120 maintains an address database in connection with the routing function that stores some information about each address for use when the address is a source address and other information about each address for use when the address is a destination address. In some embodiments, the address database may include an IP next-hop table to direct the data packet to an intermediate device en route to its final destination.

Figure 2:
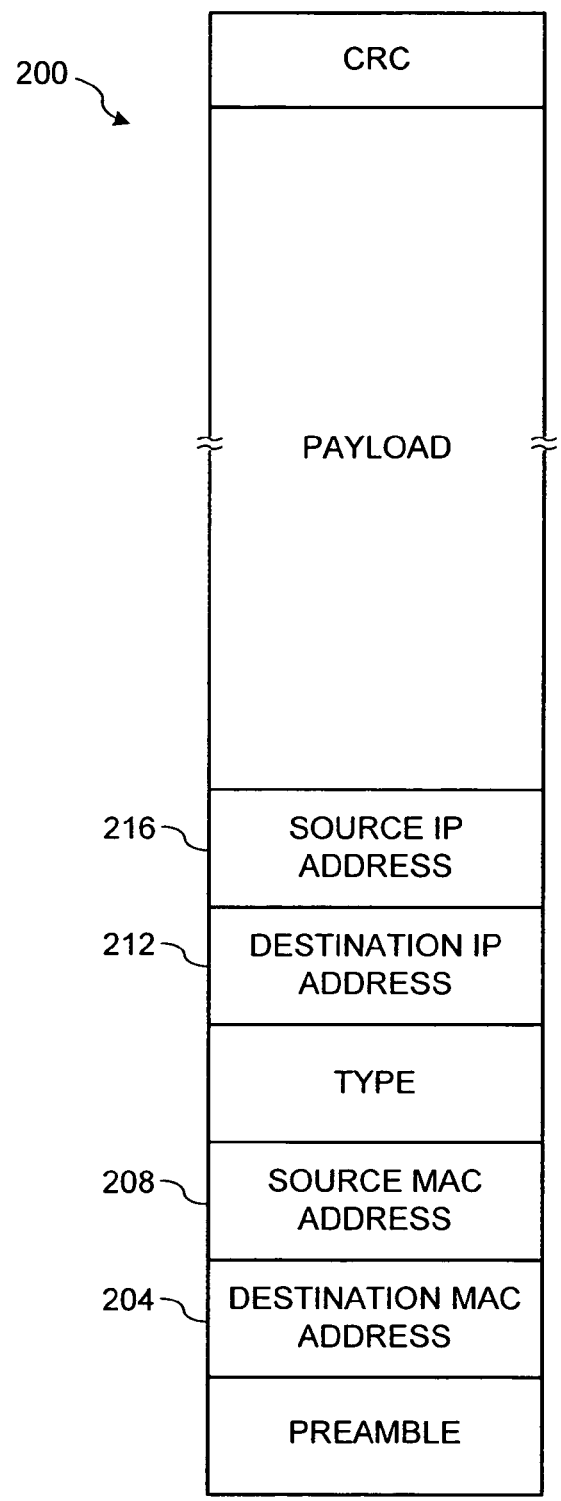
FIG. 2 shows various fields of an exemplary data packet as known in the prior art.

Referring next to FIG. 2, an exemplary Ethernet data packet 200 as known in the prior art is shown. The exemplary data packet 200 contains source address and destination address information. These addresses comprise both physical addresses and logical addresses. Physical addresses may be used in connection with processing operations conducted at the Data Link Layer (Layer 2) whereas logical addresses may be used in connection with processing operations conducted at the Network Layer (Layer 3).

Layer 2 addresses in the exemplary data packet 200 include the Destination Media Access Control (MAC) address 204 and the Source Media Access Control (MAC) address 208. These addresses uniquely identify Layer 2 network components and are commonly used to perform switching or bridging operations. The exemplary data packet 200 also includes Layer 3 address information. In this example, an IP packet is contained within the Ethernet frame. Thus, the exemplary data packet 200 includes a Destination IP Address 212 and Source IP Address 216. These Layer 3 addresses uniquely identify network components at the logical level and are commonly used to perform routing functions. Embodiments of the network packet processor may support different packet types and versions. For example, IP packets may include IPv4 or IPv6 addresses.

The network packet processor extracts a source address and a destination address from each data packet received. These addresses may include Layer 2 addresses and Layer 3 addresses depending upon device settings and the processing operations involved. For example, if the destination is located on another network, the network packet processor may use Layer 3 address information to route the data packet to its destination. On the other hand, if the destination is on a local area network, Layer 2 address information may be used to bridge the data packet across LAN segments.

After address information has been extracted from a data packet, the network packet processor queries an address database to obtain additional information about the source address and the destination address. Different address databases may be queried depending upon the type of processing. For example, a Layer 2 address database may be queried in connection with bridging operations and a Layer 3 address database may be queried in connection with routing operations. The structure of entries in these databases may be similar or different and they may vary in size. In each case, however, the address databases store two sets of information. The first set of information is used when the address is a source address and the second set of information is used when the address is a destination address.

The action taken when a specific entry corresponding to a source address or a destination address is not found in the address database depends upon the type of processing performed. For example, if a data packet is being routed, the network packet processor may query a next-hop table to get information about Layer 3 source and destination addresses. This query may implement a longest prefix match algorithm and return an entry matching as much of a source or destination address as possible. If no part of a source or destination address can be matched, an entry in the next-hop table corresponding to zero-length prefixes is returned and provides default address information.

Unknown Layer 2 addresses are handled differently. The network packet processor may query a forwarding address database for information about the source and destination addresses. If an entry matching the source address or the destination address cannot be found, a miss may be signaled. The network packet processor may respond to this event by applying default settings to the data packet. For example, the network packet processor may maintain default source address information and default destination address information apart from the address database and may assign this information to the data packet as part of the Layer 2 processing of the data packet.

The source address query and destination address query each return privilege information from the address database to the network packet processor. The privilege information includes an access group associated with the source address and a resource group associated with the destination address. A network device is assigned an access group for data packets it sends over the network and a resource group for data packets it receives from other devices. The device may be assigned a Layer 2 access group and resource group and a separate Layer 3 access group and resource group. Table 1 shows an exemplary entry in an address database where the access group and resource group are represented by 2-bit values.

TABLE 1

| Address | Source address information | | Destination address information | |
|---|---|---|---|---|
| | Access group | Other information | Resource group | Other information |
| 000D56E60E81 | 11 (0x3) | FEA81935 | 01 (0x1) | 9FC1037A |

Based upon the access group and the resource group, the network packet processor assigns a command to the data packet. The command determines how the data packet will be handled in subsequent processing stages. In some embodiments, the command may be FORWARD, HARD DROP, or SOFT DROP. A FORWARD command means that the data packet will be allowed to continue through the packet processor. DROP commands indicate that the packet will be discarded and not allowed to continue. If a packet is assigned a HARD DROP command, it is discarded and does not undergo further processing. Packets that are assigned the SOFT DROP command may be subject to further processing by the packet processor but will not be forwarded to their destinations. In some embodiments, if a packet is assigned a SOFT DROP command, a security log entry including the source address, the destination address, and information about the contents of the data packet may be made by the network packet processor.

Some embodiments of the present invention assign a command to the data packet by performing a lookup on an access matrix. For example, a particular embodiment of the network packet processor may support 8 access groups and 8 resource groups. The size of the access matrix may vary and may be configurable to support different network arrangements. Generally speaking, however, an access matrix may contain $2^N$ rows and $2^M$ columns where N represents the number of available access groups and M represents the number of resource groups.

Table 2 shows a simplified access matrix in which the access group and resource group are each expressed as 2-bit values. This arrangement supports a total of four access group levels and four resource group levels. The access group is used as a column index and the resource group is used as a row index. The command to be assigned is an entry defined by the intersection of the row and column. For example, if the access group is 00 and the resource group is 01, the packet will be assigned a HARD DROP command. Similarly, if the access group is 11 and the resource group is also 11, the packet will be assigned the FORWARD command.

TABLE 2

| | | Access Group | | | |
|---|---|---|---|---|---|
| | | 00 | 01 | 10 | 11 |
| Resource Group | 00 | HARD DROP | HARD DROP | FORWARD | HARD DROP |
| | 01 | HARD DROP | FORWARD | FORWARD | FORWARD |
| | 10 | FORWARD | FORWARD | FORWARD | FORWARD |
| | 11 | HARD DROP | FORWARD | FORWARD | FORWARD |

In some embodiments, the access group and the resource group may correspond to device categories. In this arrangement, the network packet processor processes a data packet by first determining the access group associated with the sender of the data packet and the resource group associated with its intended recipient. The network packet processor uses the access group and the resource group to retrieve a command from an access matrix. A sample access matrix with devices grouped by category is shown in Table 3.

TABLE 3

| Resource Group → | Untrusted Hosts | Trusted Hosts | Authentication Servers | Routers |
|---|---|---|---|---|
| Access group = Untrusted Host | HARD DROP | HARD DROP | FORWARD | HARD DROP |
| Access group = Trusted Host | HARD DROP | FORWARD | FORWARD | FORWARD |
| Access group = Authentication Servers | FORWARD | FORWARD | FORWARD | FORWARD |
| Access group = Routers | HARD DROP | FORWARD | FORWARD | FORWARD |

The commands in the access matrix may be dynamically updated by the packet processor in response to network events. Also, the access matrix may be symmetric or not symmetric depending upon the particular configuration.

Figure 3:
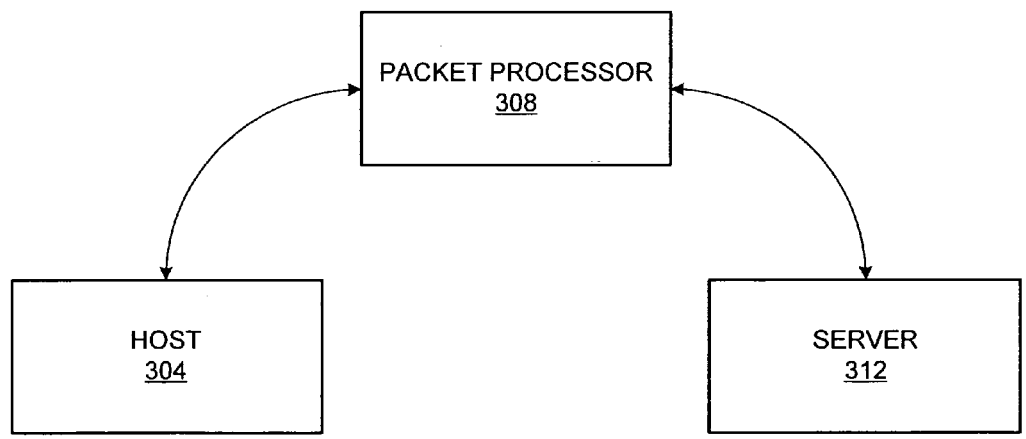
FIG. 3 shows a network packet processor in communication with an authentication server and a multitude of devices in accordance with an embodiment of the present invention.

With reference to FIG. 3, a network packet processor 308 in accordance with an embodiment of the present invention is shown in a simplified interaction between a host 304 and a server 312. In this example, the host 304 wishes to access resources on the server 312. The host 304 and server 312 may be located within the same network or may be in different networks. The host 304 attempts to access the server 312 by sending data packets with the server's address to the network packet processor 308.

The source address of the data packet corresponds to the host 304 and the destination address of the data packet corresponds to the server 312. When the data packet is received, the packet processor 308 queries the address database with the source address. The query returns an access group associated with the host 304 based upon its source address. The access group may indicate, for example, that the host 304 is a "Trusted Host." In the case of Layer 2 processing, default information, including a default access group, may be assigned to the data packet if a match is not found in the address database. Next, the network packet processor 308 queries the address database with the destination address. The query returns a resource group associated with the server 312 based upon its destination address (or a default resource group as previously discussed). For example, the destination address may indicate that the server 312 is part of the "Untrusted Hosts" resource group. In this case, the access matrix indicates that the data packet should be assigned a HARD DROP command and discarded. However, if the destination address indicated that the server 312 was part of the "Authentication Servers" resource group, the data packet would be assigned a FORWARD command and allowed to continue through the packet processor 308.

Some embodiments of the present invention assign the network broadcast address to a special resource group. IP networks, for example, reserve a broadcast address for special network communications. Data packets specifying the broadcast address as their destination are received by all devices on the network. The broadcast address is commonly used by system administrators to diagnose network problems. However, it may also be used by hackers and malicious users to attack the network. For example, hackers might send large numbers of data packets to the broadcast address in an attempt to implement a Denial of Service attack. Similarly, malicious users might exploit the fact that broadcast packets are received by all network devices to explore network topology in search of vulnerabilities.

The present invention is capable of selectively filtering data packets sent to the network broadcast address. For example, the network broadcast address might be assigned to a resource group that is accessible only to system administrators. In this way, system administrators can use the broadcast address to debug network problems while blocking its use by others.

Figure 4:
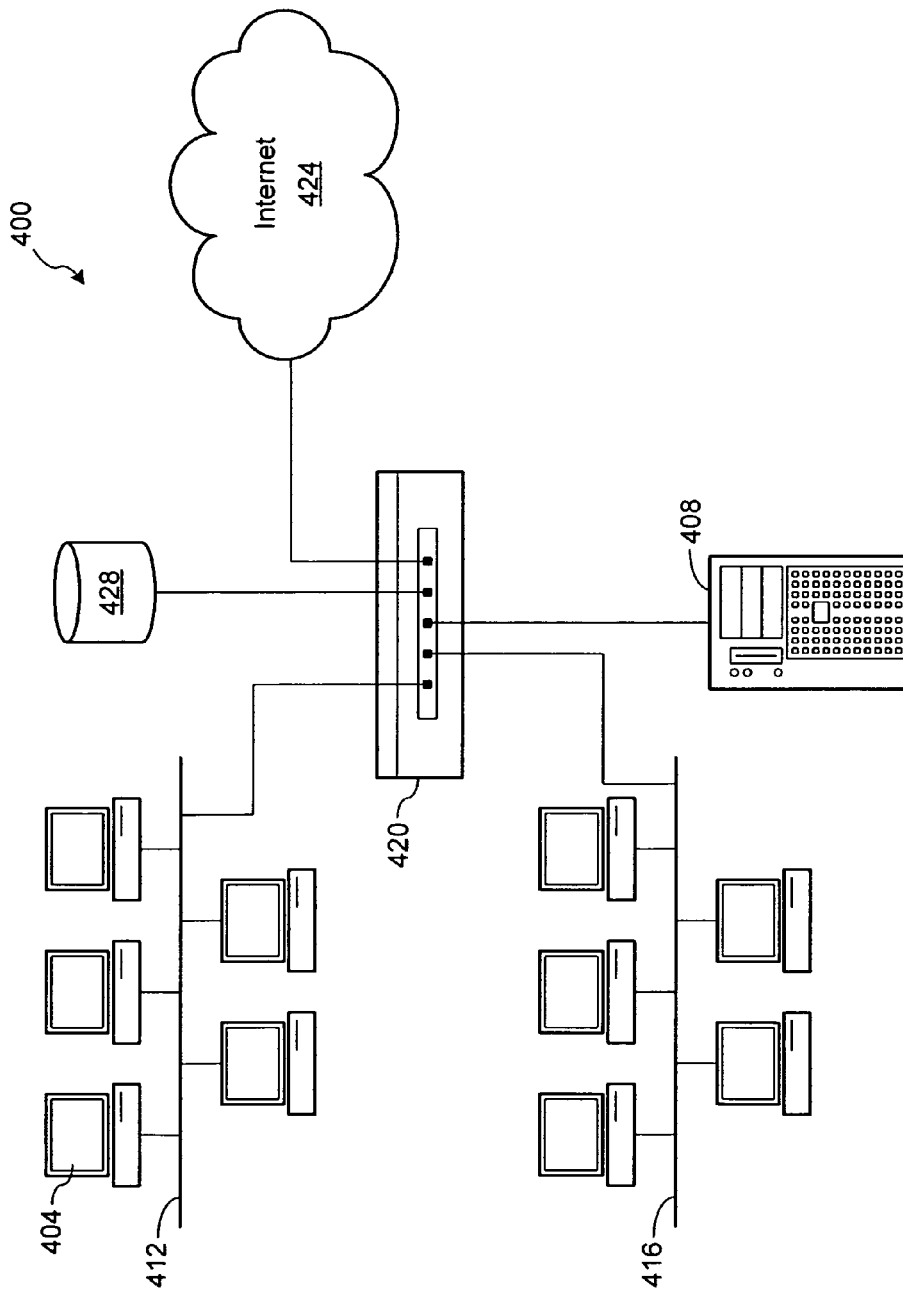
FIG. 4 is a high-level view of a network packet processor in communication with an authentication server according to an embodiment of the present invention.

Referring to FIG. 4, a high-level view 400 of a network packet processor 420 and other network components, including an authentication server 428, is shown. Embodiments of the present invention allow access groups and resource groups to be assigned dynamically to source addresses and destination addresses respectively. Thus, for example, a network administrator might use a particular workstation 404 temporarily to perform administrative tasks. In this case, the administrator could establish a connection to an authentication server 428 and send data packets requesting a change to the access group or resource group corresponding to the network address of the temporary workstation 404. After receiving proper credentials from the system administrator, the authentication server 428 could send data packets to the network packet processor 420 specifying the network address of the workstation and a new privilege level to assign.

The new privilege level might include a new access group for data packets sent from the workstation 404, a new resource group for data packets sent to the workstation 404, or both. In addition, these changes could involve Layer 2 and/or Layer 3 addresses. Upon receipt of data packets from the authentication server 428, the network packet processor 420 may update entries in the appropriate address database to reflect the change in privilege level. In some embodiments of the present invention, the packet processor 420 performs an update query on a 3-bit field in an appropriate address database corresponding to a source address entry and/or a destination address entry. Other embodiments may implement privilege level using a combination of fields use and/or fields with different sizes.

The authentication server 428 may provide a secure means of authenticating users and communicating with the network packet processor 420. This may include the use of one or more network protocols and the use of one or more encryption algorithms. For example, the authentication server 428 may require a workstation to provide username and password credentials. In addition, the authentication server may require credentials in the form of specially designed hardware, including a smart card, or coded biometric information before sending authentication data packets to the network packet processor 420.

Figure 5A:
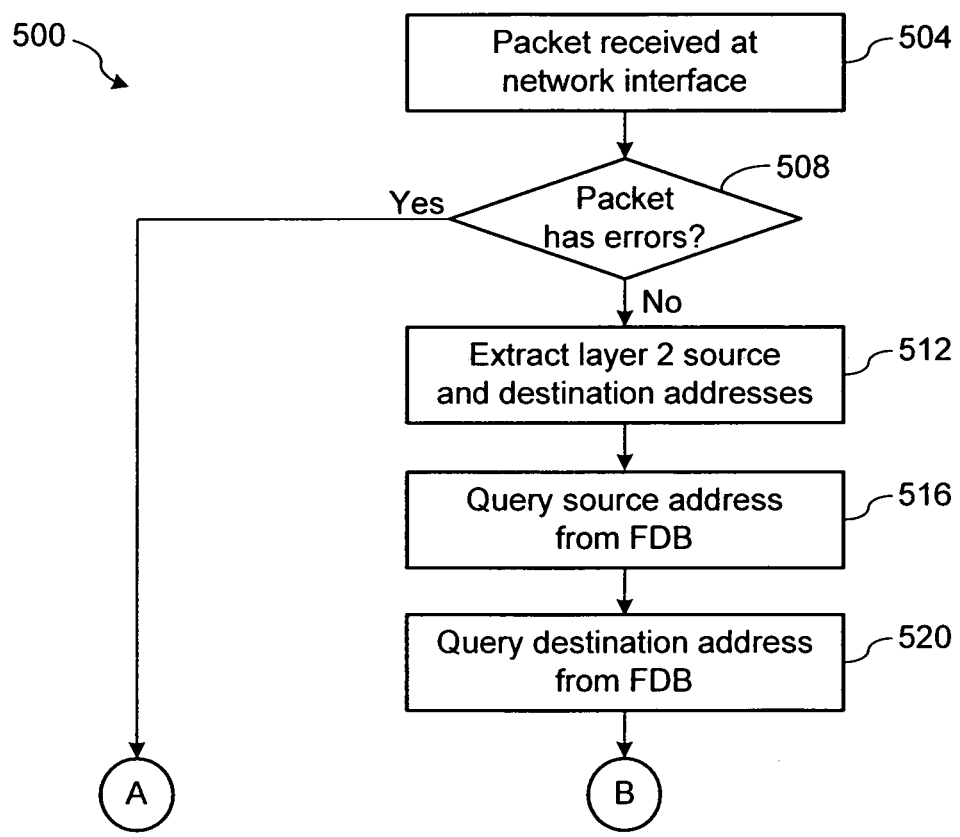
FIGS. 5A and 5B are a flow chart of the process by which a command is assigned to a data packet in accordance with an embodiment of the present invention.

FIG. 5A is a flow chart 500 of the process by which a command is assigned to a data packet according to an embodiment of the present invention. In a first step 504, a data packet is received at a network interface. The network interface may be a network port. The data packet is then checked for errors 508. If the data packet has errors, it may be dropped 556; otherwise, processing of the data packet continues. In a next step 512, a Layer 2 source address and destination address are extracted from the data packet. The packet processor performs separate queries for both the source address and the destination address in the address database. A first query is made in a forwarding address database 516 using the Layer 2 source address. A second query is then made in the forwarding address database using the Layer 2 destination address 520. Based upon these queries, an access group and a resource group are assigned to the data packet. Alternatively, if a miss occurs, default access group or default resource group information may be assigned to the data packet.

Figure 5B:
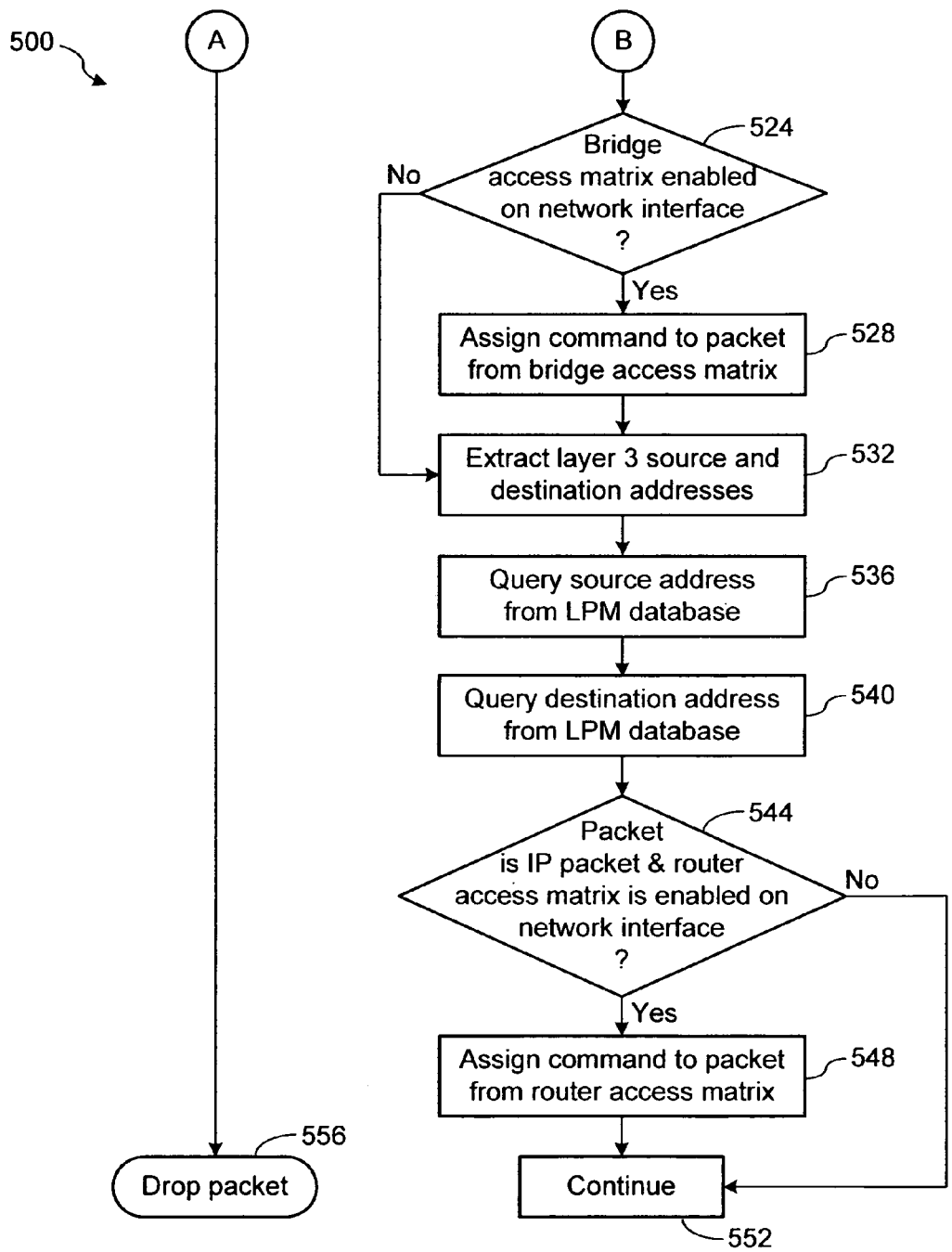

Referring now to FIG. 5B, the packet processor determines whether a command should be assigned to the packet based upon the Layer 2 address information. As shown, a bridge access matrix may be selectively enabled or disabled at the network interface where the packet was received 524. If the bridge access matrix is enabled, the Layer 2 access group and resource group values are used to assign a command to the packet from the bridge access matrix 528. If the bridge access matrix is not enabled, a next processing stage may begin.

Layer 3 processing may optionally be performed on the data packet. As with Layer 2 processing, the network packet processor first extracts a source address and a destination address from the data packet 532. These addresses are logical addresses and may, for example, represent network components in an IP network. When the Layer 3 source and destination addresses have been extracted, the packet processor queries an address database for additional information about the data packet. In some embodiments, these queries may be directed to a prefix database and the results may be based upon a longest-prefix match algorithm as previously discussed. Thus, a first query 536 is performed in the prefix database using the Layer 3 source address and a second query 540 is performed using the Layer 3 destination address of the data packet. These queries may return pointers to a next-hop table that contains access group and resource group information for the data packet.

In a next step 544, the packet processor determines whether a command should be assigned to the data packet based upon the Layer 3 address information. As shown, the packet processor may also decide whether to assign the command based upon the type of the data packet. For example, a router access matrix may be enabled on a network interface for IP packets received at the network interface. If enabled, the Layer 3 access group and resource group values may be used to assign a command to the packet from the router access matrix 548. Processing of the data packet continues 552 following these operations.

Figure 6:
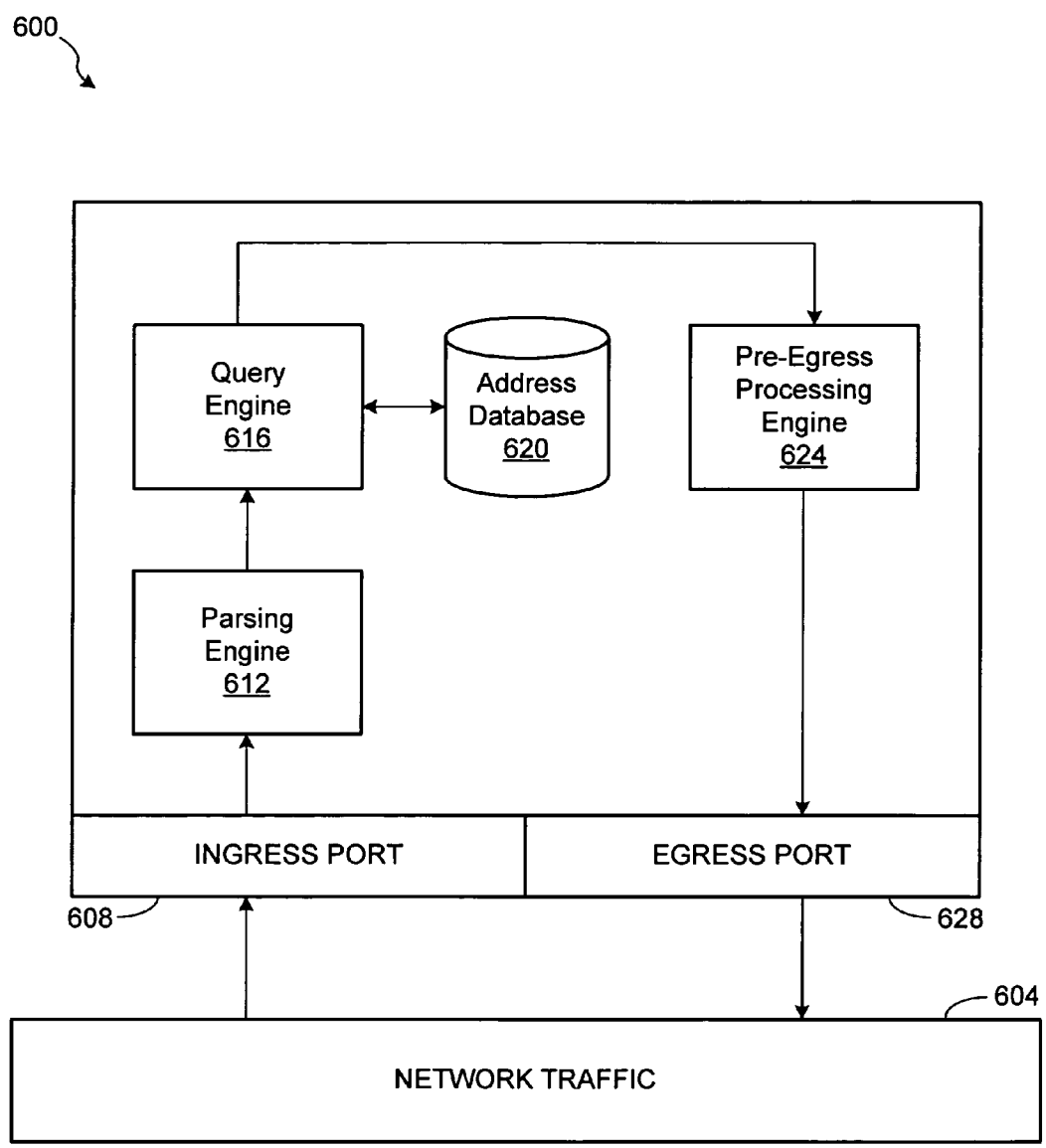
FIG. 6 shows various blocks of the network packet processor of FIG. 1.

With reference to FIG. 6, a block-diagram 600 of a network packet processor in accordance with an embodiment of the present invention is shown. A data packet from the network 604 enters the packet processor 602 through an ingress port 608. The data packet is then processed by a parsing engine 612. The parsing engine 612 is configured to extract a source address and a destination address from the data packet. As previously discussed, the data packet may contain both Layer 2 and Layer 3 address information. The parsing engine is configured to extract both Layer 2 and Layer 3 addresses. The source and destination addresses extracted by the parsing engine 612 are presented to a query engine 616. The query engine 616 performs a first query of the source address in an address database 620. The address database 620 may include a forwarding address database or a next-hop table depending upon the type of processing performed. For example, Layer 3 processing operations may query a prefix database to obtain a pointer to a next-hop table that contains additional information about Layer 3 addresses. Similarly, Layer 2 processing operations query a forwarding address database and may return information about the data packet or signal a miss when a matching entry cannot be found.

The query engine 616 returns an access group and a resource group for the data packet along with other information from the address database 620. The access group is determined from the source address and the resource group is determined from the destination address. In the case of Layer 2 processing, default access group or default resource group information may be assigned to the data packet if an address is not found in address database 620. A pre-egress processing engine 624 receives information about the data packet from the query engine 616. The pre-egress processing engine 624 then assigns a command to the data packet based upon the access group and the resource group.

In some embodiments, the pre-egress processing engine 624 uses an access matrix to determine the command to assign which may include FORWARD, HARD DROP, or SOFT DROP. If command assigned is FORWARD, additional processing stages may follow before the data packet exits the packet processor 602 via an egress port 628. Otherwise, the packet may be dropped and all of its resources released to the system. In some embodiments, the pre-egress processing engine 624 adds entries to a system log when data packets are dropped. These entries may contain detailed information about the data packet such as its content, the port where it was received, the source address, and the destination address.

While the principles of the disclosure have been described above in connection with specific apparatuses and methods, it is to be clearly understood that this description is made only by way of example and not as limitation on the scope of the invention.

What is claimed is:

1. A method of processing data packets in a network, the method comprising:
receiving a data packet at a network interface from a source device requesting access to a resource provided in the network;
extracting from the data packet a source address of the source device and a destination address of a destination device to which the data packet is to be transmitted;
performing a first query in an address database to retrieve a first device category associated with the source address, the first device category being of a plurality of first device categories of devices requesting access to resources in the network;
performing a second query in the address database to retrieve a second device category associated with the destination address, the second device category being of a plurality of second device categories of devices providing the resources in the network;
determining a command to assign the data packet in response to the source address being associated with the first device category and the destination address being associated with the second device category, the command identifying how to process the data packet; and
assigning the command to the data packet.

2. The method of claim 1, wherein the plurality of first device categories specifies a first dimension of an access matrix, wherein the plurality of second device categories specifies a second dimension of the access matrix, wherein determining the command to assign the data packet comprises determining an entry in the access matrix defined by an intersection of the first and the second dimensions corresponding to the first and second device categories.

3. The method of claim 1, wherein the command assigned to the data packet is selected from the group consisting of FORWARD, SOFT DROP, and HARD DROP.

4. The method of claim 3, further comprising logging information about data packets that are assigned the command HARD DROP or SOFT DROP.

5. The method of claim 1, wherein the first device category is indicative of a privilege level associated with the source device and the second device category is indicative of a privilege level associated with the destination device.

6. The method of claim 1, further comprising: receiving authentication data packets at the network interface, and changing access group information associated with the plurality of first device categories and resource group information associated with the plurality of second device categories as directed by the authentication data packets.

7. The method of claim 6, wherein the authentication data packets originate from an authentication server connected to the network and the authentication server requires a password, smart card, or biometric identification before sending authentication packets.

8. The method of claim 1, wherein the source and destination addresses are one of Layer 2 addresses and Layer 3 addresses.

9. The method of claim 8, wherein the source and destination addresses are Layer 2 addresses wherein the address database includes a forwarding address database.

10. The method of claim 9, further comprising: retrieving a first default value that is assigned to the data packet when the source address is not found in the forwarding address database and retrieving a second default value that is assigned to the data packet when the destination address is not found in the forwarding address database.

11. The method of claim 8, wherein the source and destination addresses are Layer 3 addresses, and wherein the address database includes a destination address entry corresponding to a network broadcast address.

12. The method of claim 8, wherein the source and destination addresses are Layer 3 addresses, and wherein the address database includes a next-hop table.

13. The method of claim 12, wherein a longest prefix match algorithm is used to retrieve the access group information associated with the source address and the resource group information associated with the destination address.

14. The method of claim 12, wherein the next-hop table includes access group information characterized by a first default value and resource group information characterized by a second default value.

15. A network device for processing data packet traffic, the network device comprising:
- a network interface configured to receive a data packet from a source device requesting access to a resource provided in a network;
- a parsing engine configured to extract from the data packet a source address of the source device and a destination address of a destination device to which the data packet is to be transmitted;
- an address database;
- a query engine configured to:
  - retrieve a first device category associated with the source address from the address database, the first device category being of a plurality of first device categories of devices requesting access to resources in the network, and
  - retrieve a second device category associated with the destination address from the address database, the second device category being of a plurality of second device categories of devices providing the resources in the network; and
- a processing engine configured to:
  - determine a command to assign the data packet in response to the source address being associated with the first device category and the destination address being associated with the second device category, the command identifying how to process the data packet; and
  - assign the command to the data packet.

16. The network device as recited in claim 15, wherein the plurality of first device categories specifies a first dimension of an access matrix, wherein the plurality of second device categories specifies a second dimension of the access matrix, and wherein the processing engine is configured to determine an entry in the access matrix defined by an intersection of the first and second dimensions row corresponding to the first and second device categories.

17. The network device as recited in claim 15, wherein the command assigned to the data packet is selected from the group consisting of FORWARD, SOFT DROP, and HARD DROP.

18. The network device as recited in claim 17, wherein the processing engine is further configured to log information about data packets that are assigned the command HARD DROP or SOFT DROP.

19. The network device as recited in claim 15, wherein the first device category is indicative of a privilege level associated with the source device and wherein second device category is indicative of a privilege level associated with the destination device.

20. The network device as recited in claim 15, wherein the query engine is further configured to modify an entry in the address database in response to authentication data packets received at the network interface.

21. The network device as recited in claim 20, wherein the authentication data packets originate from an authentication server connected to the network and wherein the authentication server requires a password, smart card, or biometric identification before sending authentication packets.

22. The network device as recited in claim 15, wherein the source address and the destination address are one of Layer 2 addresses and Layer 3 addresses.

23. The network device as recited in claim 22, wherein the source and destination addresses are Layer 2 addresses, and wherein the address database includes a forwarding address database.

24. The network device as recited in claim 23, wherein the query engine is further configured to retrieve a first default value that is assigned to the data packet when the source address is not found in the forwarding address database and retrieve a second default value that is assigned to the data packet when the destination address is not found in the forwarding address database.

25. The network device as recited in claim 22, wherein the source and destination addresses are Layer 3 addresses, and wherein the address database includes a destination address entry corresponding to a network broadcast address.

26. The network device as recited in claim 22, wherein the source and destination addresses are Layer 3 addresses, and wherein the address database includes a next-hop table.

27. The network device as recited in claim 26, wherein a longest prefix match algorithm is used to retrieve access group information associated with the source address and resource group information associated with the destination address.

28. The network device as recited in claim 26, wherein the next-hop table includes access group information characterized by a first default value and resource group information characterized by a second default value.

29. The method of claim 1, wherein the first device category indicates a first level of trustworthiness associated with the source device and the second device category indicates a second level of trustworthiness associated with the destination device.

30. The network device as recited in claim 15, wherein the first device category indicates a first level of trustworthiness associated with the source device and the second device category indicates a second level of trustworthiness associated with the destination device.

31. The method as recited in claim 1, wherein each of the plurality of first device categories and the plurality of second device categories comprises two or more of an untrusted host, a trusted host, an authentication server, or a router.

32. The network device as recited in claim 15, wherein each of the plurality of first device categories and the plurality of second device categories comprises two or more of an untrusted host, a trusted host, an authentication server, or a router.

* * * * *